Figure 1:
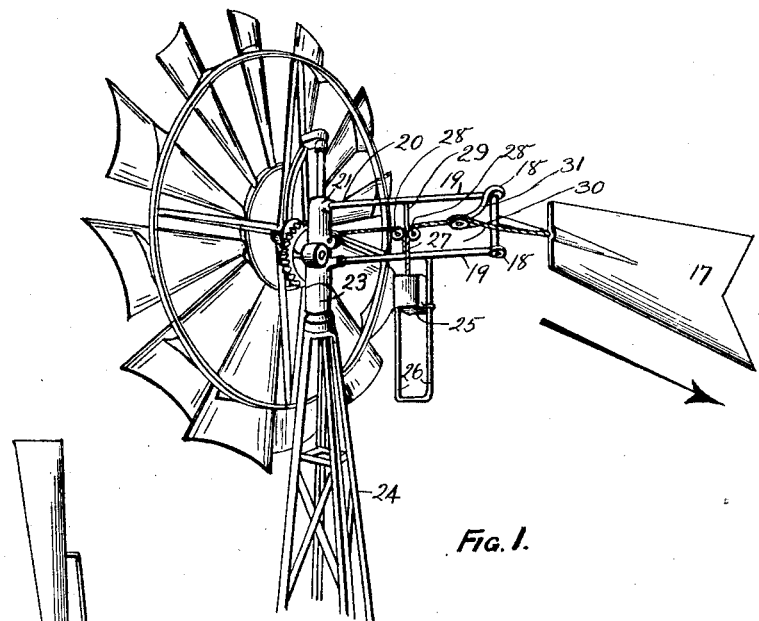

A. P. TURNBULL.
MEANS FOR GOVERNING THE SPEED OF WIND MOTORS.
APPLICATION FILED APR. 12, 1912.

1,112,240.

Patented Sept. 29, 1914.
2 SHEETS—SHEET 1.

WITNESSES
Sidney Brooks
A. L. Kitchin

INVENTOR
Alfred Percy Turnbull
BY Munn & Co
ATTORNEYS

UNITED STATES PATENT OFFICE.

ALFRED PERCY TURNBULL, OF SYDNEY, NEW SOUTH WALES, AUSTRALIA.

MEANS FOR GOVERNING THE SPEED OF WIND-MOTORS.

1,112,240.   Specification of Letters Patent.   Patented Sept. 29, 1914.

Application filed April 12, 1912. Serial No. 690,390.

*To all whom it may concern:*

Be it known that I, ALFRED PERCY TURNBULL, a subject of the King of Great Britain and Ireland, residing at "Romsey," Victoria street, Randwick, Sydney, in the State of New South Wales and Commonwealth of Australia, have invented a new and useful Improved Means for Governing the Speed of Wind-Motors, of which the following is a specification.

Heretofore the tail piece and the pivoted head frame carrying the wind wheel have been geared together so that the latter may automatically turn toward the tail piece and out of the wind, such movement being counteracted by an adjustable opposing factor such as a weight or spring.

The present invention, therefore, relates particularly to the above principle wherein the wind wheel has independent movement in relation to the tail piece against a counteracting factor, and provides such mechanical improvements in the application of that principle that the sensitiveness of the governing device is considerably enlarged, the structural arrangements simplified and the regulation device so arranged that while it is adapted to be accessible from the base of the tower it is also adapted to be rendered inoperative whereby the wind wheel is permitted to move out of action. And according to this invention these improvements with the objects specified are effected by vertically hinging the tail piece to the pivoted head frame, and positioning the wind wheel at such a distance forward of the axis of the pivot that the wind pressure acting on the surface of the wind wheel imparts a predetermined effort to the same to rotate about said pivot and toward the hinged vane which latter remains parallel in the direction of the wind, the effort mentioned being effected against an adjustable counteracting factor such as a weight or spring. The counteracting factor is so arranged or connected to the hinged vane and the pivoted head frame as to normally retain the wind wheel in the wind until the maximum speed required is exceeded when the rotary motion of the wind wheel about the axis common to it and the head frame takes place against the opposing factor. The counteracting device is rendered inactive from the base of the tower for the purpose of allowing the wind wheel to rotate out of the wind and become inoperative when desired.

Figure 2:
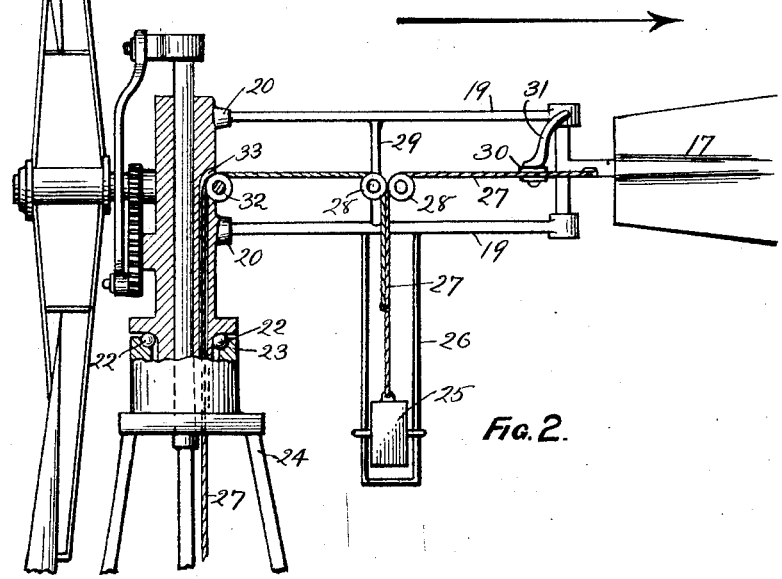
Figure 3:
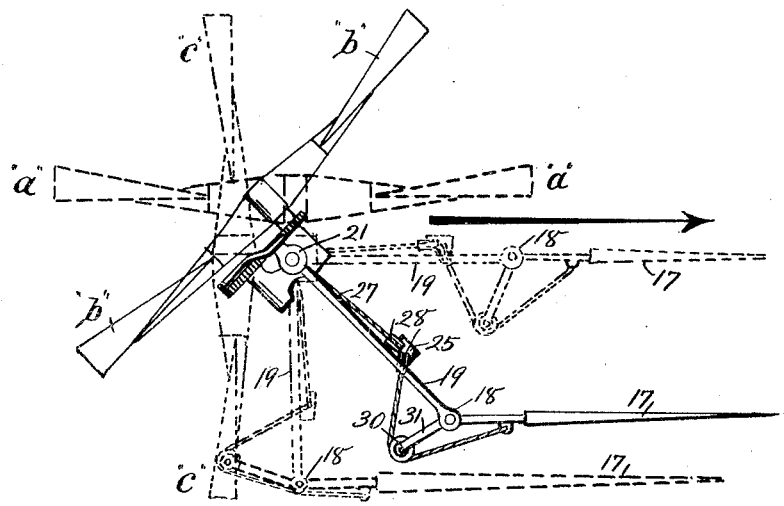

Referring to the drawings accompanying and forming part of this specification wherein applications of the improvements according to this invention are depicted, Figures 1 and 2 depict the application of the invention to a wind wheel operating a vertically reciprocating rod the former figure being a perspective view, and the latter a vertical sectional elevation of the head frame. Fig. 3 is a diagrammatic view depicting the operation of the wind motor depicted in the preceding figures, Fig. 4 being a modification of the counteracting factor consisting of a coil spring positioned at the base of the tower.

Referring to the drawings, the vane or tail piece 17 of the plain or Y type is vertically hinged between the free ends 18 of the parallel rods 19 whose other ends 20 are affixed to the pivoted or rotatable head frame 21 mounted on ball bearings 22 upon the bed plate 23 affixed at the top of the tower 24. The counterweight 25 is suspended between guides 26 dependent from the lower of the parallel rods 19 carrying the wind vane 17, the suspension rope 27 passing through pulleys 28 mounted on the stay 29 positioned between the parallel rods 19, from which pulleys the rope 27 diverges in opposite directions, one member passing over pulley 30 mounted on the arm 31 attached to the upper of the rods 19 and secured to the hinged vane 17 and the other member passing over pulley 32 mounted on the pivoted frame 21 thence through orifice 33 provided in the said frame and its bed plate 23 to the base of the tower. The portion of the rope passing to the base of the tower is provided with a swivel joint to take up the twist.

Figure 4:
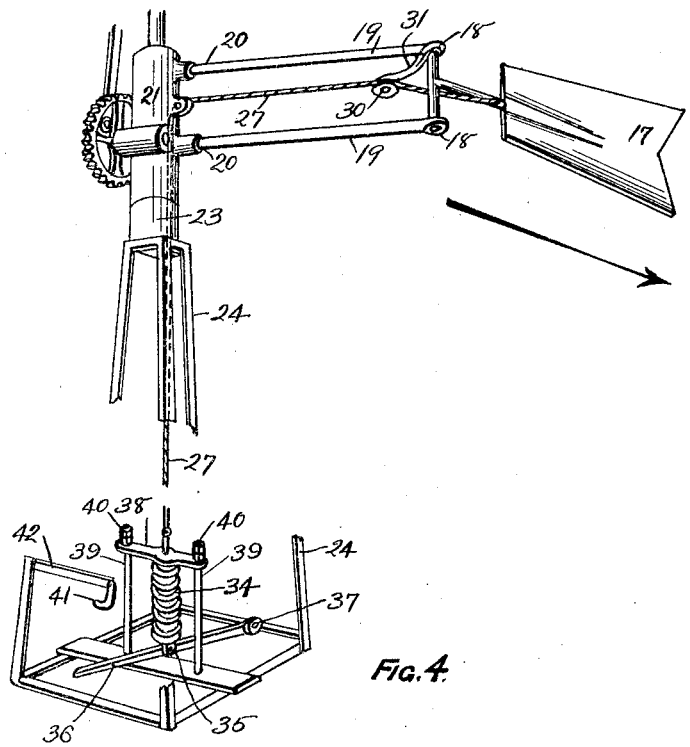

In Fig. 4 the counteracting factor shown is that of a coil spring 34 positioned at the base of the tower, being supported upon the circular plate 35 pivotally attached to lever 36 that is fulcrumed at 37 to the framework of the tower 24; said spring taking between plate 35 and the cross head 38 supported by vertical rods 39 whose top ends are screw threaded and provided with nuts 40 for the purpose of adjusting the position of the cross head 38 and consequently altering the tension of the spring 34.

In operation, the wind wheel being so positioned at a distance forward of the axis of the pivoted head frame 21 that it has a decided tendency to rotate out of the wind and toward the tail piece 17, it will when exceeding the maximum speed required (which speed is determined by the counteracting weight 25 or spring 34) rotate with the pivoted frame upon the vertical axis common to both, against the power of the counteracting device. The movement of the parallel rods 19 affixed to the pivoted head frame 21 draws up the weight 25 (or compresses the spring 34 as the case may be) as shown in Fig. 1 which weight movement or spring compression continues with increasing wind pressure until the wind wheel takes up a position out of the wind and parallel or approximately parallel to the tail piece as indicated by heavily dotted lines (a) in Fig. 3 in which diagrammatic figure the full lines (b) indicate the position of the parts when the wheel is partly out of the wind and the faintly dotted lines (c) when the wheel is fully in the wind, which latter position is maintained by the counterweight 25 or spring 34 until the maximum speed is exceeded. The vane 17 being hinged to the rods 19 remains parallel with the direction of the wind as shown. When required for any reason to render the wind wheel inoperative the weight 25 is raised by hauling on the auxiliary portion of the rope 27 that passes to the base of the tower the rope being made fast when the weight is sufficiently raised to permit the wind wheel to swing out of the wind and into position (a) Fig. 3 or where a spring such as 34 is employed the same is compressed by raising the lever 36 which is then secured by the hooked member 41 depending from the free end of the bracket 42 affixed to the framework of the tower 24 (see Fig. 4).

I claim:—

1. In means for governing the speed of wind motors, a tower, a head mounted to turn on the tower and carrying a pulley, a wind wheel mounted on the head, laterally projecting and spaced rods on the head and carrying two pulleys intermediate their ends, a tail piece pivoted between the outer ends of the said rods, an arm projecting from the upper rod at an angle thereto, and carrying a pulley, guides depending from the lower rod opposite the pulleys of said rods, a weight sliding in said guides, and a rope or cable secured to the weight and having diverging members, one member passing over one of the pulleys of the rods and the pulley of the arm and secured to the tail piece, and the other member passing over the other pulley of the rods and the pulley of the head and extending down to the base of the tower.

2. In a device of the character described, a power structure, a framework mounted to rotate on the vertical axis of said power structure, said framework having a radially positioned tail piece receiving member and a wind wheel receiving member offset from the radial line drawn through said vertical axis and said tail piece receiving member, a wind wheel mounted on said wind wheel receiving member, a pivotally mounted tail piece arranged on said tail piece receiving member, a bracket extending from the end of said tail piece receiving member at an angle thereto, a pulley on the end of said bracket, a cable connected to said tail piece extending over said pulley, a second pulley for said cable for guiding the same into a vertical direction to the base of the power structure, and a weight mounted on said cable below said second mentioned pulley whereby said tail piece is held normally as a continuation of said tail piece receiving member of said framework, but is permitted to move from that position when said wind wheel has attained a predetermined speed by reason of pressure thereon as the tendency of said wheel to rotate around said vertical axis will be greater than the resistance of said weight thus causing the tail piece to turn the wind wheel out of the wind.

ALFRED PERCY TURNBULL.

Witnesses:
ROBERT J. KNOX,
H. C. CAMPBELL.

---

Copies of this patent may be obtained for five cents each, by addressing the "Commissioner of Patents, Washington, D. C."